(12) United States Patent
Miess et al.

(10) Patent No.: US 8,069,935 B1
(45) Date of Patent: *Dec. 6, 2011

(54) SUPERABRASIVE ELEMENT, AND SUPERABRASIVE COMPACT AND DRILL BIT INCLUDING SAME

(75) Inventors: David P. Miess, Highland, UT (US); Jiang Qian, Cedar Hills, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/792,913

(22) Filed: Jun. 3, 2010

Related U.S. Application Data

(63) Continuation of application No. 11/638,075, filed on Dec. 13, 2006, now Pat. No. 7,753,143.

(51) Int. Cl.
*E21B 10/36* (2006.01)
(52) U.S. Cl. .......................................... 175/374; 175/434
(58) Field of Classification Search .................. 175/374, 175/426, 434
See application file for complete search history.

(56) References Cited

U.S. PATENT DOCUMENTS

| | | | |
|---|---|---|---|
| 4,124,401 A | 11/1978 | Lee et al. | |
| 4,268,276 A | 5/1981 | Bovenkerk | |
| 4,274,900 A | 6/1981 | Mueller et al. | |
| 4,380,471 A | 4/1983 | Lee et al. | |
| 4,410,054 A | 10/1983 | Nagel et al. | |
| 4,468,138 A | 8/1984 | Nagel | |
| 4,560,014 A | 12/1985 | Geczy | |
| 4,738,322 A | 4/1988 | Hall et al. | |
| 4,798,026 A | 1/1989 | Cerceau | |
| 4,811,801 A | 3/1989 | Salesky et al. | |
| 4,913,247 A | 4/1990 | Jones | |
| 5,016,718 A | 5/1991 | Tandberg | |
| 5,036,028 A * | 7/1991 | Watanabe et al. | 501/96.3 |
| 5,092,687 A | 3/1992 | Hall | |
| 5,120,327 A | 6/1992 | Dennis | |
| 5,135,061 A | 8/1992 | Newton, Jr. | |
| 5,154,245 A | 10/1992 | Waldenström et al. | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,544,713 A | 8/1996 | Dennis | |
| 5,942,455 A | 8/1999 | Barsoum et al. | |
| 6,615,935 B2 * | 9/2003 | Fang et al. | 175/374 |
| 6,793,681 B1 | 9/2004 | Pope et al. | |
| 7,441,610 B2 * | 10/2008 | Belnap et al. | 175/374 |
| 7,753,143 B1 * | 7/2010 | Miess et al. | 175/374 |
| 2002/0194955 A1 | 12/2002 | Fang et al. | |
| 2005/0230156 A1 | 10/2005 | Belnap et al. | |

(Continued)

OTHER PUBLICATIONS

U.S. Appl. No. 11/545,929, filed Oct. 10, 2006, Bertagnolli.

(Continued)

*Primary Examiner* — William P Neuder
(74) *Attorney, Agent, or Firm* — Workman Nydegger

(57) ABSTRACT

According to various aspects of the present invention, a superabrasive element includes a plurality of superabrasive grains (e.g., as diamond grains and/or cubic boron nitride grains). The superabrasive element further includes a binder constituent that bonds at least a portion of the superabrasive grains together. The binder constituent includes predominantly one or more inorganic-compound phases, such as boron or silicon compounds. Applications utilizing such superabrasive elements and methods of fabricating such superabrasive elements are also disclosed.

17 Claims, 8 Drawing Sheets

U.S. PATENT DOCUMENTS

2005/0241239 A1 11/2005 Sung
2005/0263328 A1 12/2005 Middlemiss
2006/0191723 A1 8/2006 Keshavan
2007/0272448 A1 11/2007 Griffo
2008/0085407 A1 4/2008 Cooley et al.

OTHER PUBLICATIONS

Jaworska, L. et al., "Ti3SiC2 as a Bonding Phase in Diamond Composites", Journal of Materials Science Letters, 2001, 1783-1786, vol. 20.

Jaworska, L. et al., "Diamond Composites with TiC, SiC and Ti3SiC2 Bonding Phase", High Pressure Research, 2002, 531-533, vol. 22.

Zhang, Z.F., et al., "Effects of Sintering Temperature and Si Content on the purity of Ti3SiC2 Synthesized from Ti/Si/TiC powders", Journal of Alloys and Compounds, 2003, 283-289, vol. 352.

Li, Jing-Feng, et al., "Fabrication of Highly Dense Ti3SiC2 Ceramics by Pressureless Sintering of Mechanically Alloyed Elemental Powders", Journal of Materials Science, 2003, 2661-2666, vol. 38.

Jaworska, L., et al., "Molybdenum Silicides as a Bonding Phase in Diamond Composites," Materials Science Forum, 2005, 587-593, vols. 498-499.

U.S. Appl. No. 11/638,075, Mail Date Dec. 8, 2008, Restriction Requirement.

U.S. Appl. No. 11/638,075, Mail Date Apr. 6, 2009, Office Action.

U.S. Appl. No. 11/638,075, Mail Date Oct. 7, 2009, Office Action.

U.S. Appl. No. 11/638,075, Mail Date Mar. 11, 2010, Notice of Allowance.

U.S. Appl. No. 11/638,075, Mail Date Jun. 23, 2010, Issue Notification.

* cited by examiner

SUPERABRASIVE ELEMENT, AND SUPERABRASIVE COMPACT AND DRILL BIT INCLUDING SAME

CROSS-REFERENCE TO RELATED APPLICATIONS

This application is a continuation of U.S. patent application Ser. No. 11/638,075 filed on 13 Dec. 2006, the disclosure of which is incorporated herein, in its entirety, by this reference.

TECHNICAL FIELD

The present invention relates to superabrasive elements, such as polycrystalline diamond ("PCD") elements, and applications utilizing such elements in drilling tools and components, machining equipment, bearing apparatuses, wire-drawing dies, and other apparatuses.

BACKGROUND

Wear-resistant, superabrasive compacts are utilized for a variety of mechanical applications. For example, PCD superabrasive compacts are used in drilling tools (e.g., compacts, cutting elements, gage trimmers, etc.), machining equipment, bearing apparatuses, wire-drawing machinery, and in other mechanical systems.

In one particular application, polycrystalline-diamond compacts ("PDCs") have found particular utility as superabrasive cutting elements in rotary drill bits, such as roller cone drill bits and fixed cutter drill bits. A PDC cutting element or cutter typically includes a superabrasive diamond layer or table. The diamond table is formed and bonded to a substrate using an ultra-high pressure, ultra-high temperature ("HPHT") process. The substrate is often brazed or otherwise joined to an attachment member such as a stud or a cylindrical backing A stud carrying the PDC may be used as a PDC cutting element when mounted to a rotary drill bit by press-fitting, brazing, or otherwise securing the stud into a receptacle formed in the rotary drill bit. The PDC cutting element may also be brazed directly into a preformed pocket, socket, or other receptacle formed in the rotary drill bit. Generally, a rotary drill bit may include a number of PDC cutting elements affixed to the drill bit body.

Conventional PDCs are normally fabricated by placing a cemented-carbide substrate into a container or cartridge with a volume of diamond particles or crystals positioned on a surface of the cemented-carbide substrate. A number of such cartridges may be typically loaded into an HPHT press. The substrates and volume of diamond particles are then processed under HPHT conditions in the presence of a catalyst material that causes the diamond particles to bond to one another to form a matrix of bonded diamond grains defining a diamond table. The catalyst material is often a solvent catalyst, such as cobalt, nickel, or iron that is used for facilitating intergrowth between the diamond particles.

In one conventional approach, a constituent of the cemented-carbide substrate, such as cobalt from a cobalt-cemented tungsten carbide substrate, liquefies and sweeps from the region adjacent to the volume of diamond particles into interstitial regions between the diamond particles during the HPHT process. The cobalt acts as a catalyst to facilitate intergrowth between the diamond particles, which results in bonds between adjacent diamond particles. Often, a solvent catalyst may be mixed with the diamond particles prior to subjecting the diamond grains and substrate to the HPHT process.

The solvent catalyst dissolves carbon from the diamond particles or portions of the diamond particles that graphitize due to the high temperature being used in the HPHT process. The solubility of the stable diamond phase in the solvent catalyst is lower than that of the metastable graphite under HPHT conditions. As a result of this solubility difference, the undersaturated graphite tends to dissolve into solvent catalyst and the supersaturated diamond tends to deposit onto existing diamond particles to form diamond-to-diamond bonds. Accordingly, diamond particles become mutually bonded to form a matrix of PCD with interstitial regions between the bonded diamond grains being occupied by the solvent catalyst.

The presence of the solvent catalyst in the diamond table is believed to reduce the thermal stability of the diamond table at elevated temperatures. For example, the difference in thermal expansion coefficient between the diamond grains and the solvent catalyst is believed to lead to chipping or cracking in the PDC during drilling or cutting operations, which consequently can degrade the mechanical properties of the PDC or cause failure. Additionally, some of the diamond grains can undergo a chemical breakdown or back-conversion to graphite via interaction with the solvent catalyst. At extremely high temperatures, portions of diamond grains may transform to carbon monoxide, carbon dioxide, graphite, or combinations thereof, thus, degrading the mechanical properties of the PDC.

One conventional approach for improving the thermal stability of PDCs is to at least partially remove the solvent catalyst from the PDC by acid leaching. However, removing the solvent catalyst from the PDC can be relatively time consuming for high-volume manufacturing. Therefore, manufacturers and users of superabrasive materials continue to seek improved thermally stable superabrasive materials and processing techniques.

SUMMARY

Various aspects of the present invention are directed to superabrasive elements including a binder constituent that comprises one or more inorganic-compound phases and methods of fabricating such superabrasive elements. One aspect of the present invention is directed to a superabrasive element including a binder constituent that comprises a metal-boride phase, a metal-borocarbide phase, or both. The superabrasive element includes a plurality of superabrasive grains (e.g., diamond grains and/or cubic boron nitride grains). The superabrasive element further includes a binder constituent that bonds at least a portion of the superabrasive grains together. The binder constituent includes predominantly one or more inorganic-compound phases, such as a metal-boride phase, a metal-borocarbide phase, or both.

Another aspect of the present invention is directed to a method of fabricating a superabrasive element including a binder constituent that comprises a metal-boride phase, a metal-borocarbide phase, or both. A metallic constituent, boron-containing constituent, and superabrasive particles are provided. In one embodiment of the present invention, a particulate mixture formed of metallic particles, boron-containing particles, and superabrasive particles may be provided. In another embodiment of the present invention, a number of discrete layers or regions formed of each of the particulate constituents or combinations of the particulate constituents may be provided. The metallic constituent, boron-containing constituent, and superabrasive particles are heated and consolidated together to form a binder constituent that bonds at least a portion of the superabrasive particles together. The binder constituent includes predominately one or more inorganic-compound phases. The inorganic-compound phases include a metal-boride phase, a metal-borocarbide phase, or both.

Yet another aspect of the present invention is directed to a superabrasive element including a binder constituent that comprises a metal-silicide phase, a metal-silicocarbide phase, or both. The superabrasive element includes a binder constituent including a plurality of superabrasive grains (e.g., diamond grains and/or cubic boron nitride grains) distributed through the binder constituent. The binder constituent includes one or more predominantly inorganic-compound phases, such as a metal-silicide phase, a metal-silicocarbide phase, or both. The one or more inorganic-compound phases are formed in situ during heating and consolidation of precursor constituents of the superabrasive element.

Still a further aspect of the invention is directed to a method of fabricating a superabrasive element including a binder constituent that comprises a metal-silicide phase, a metal-silicocarbide phase, or both. A metallic constituent, a silicon-containing constituent, and superabrasive particles are provided. In one embodiment of the present invention, a particulate mixture formed of metallic particles, silicon-containing particles, and superabrasive particles may be provided. In another embodiment of the present invention, a number of discrete layers or regions formed of each of the particulate constituents or combinations of the particulate constituents may be provided. The metallic constituent, silicon-containing constituent, and superabrasive particles are heated and consolidated together to form a binder constituent that bonds at least a portion of the superabrasive particles together. The binder constituent includes predominately one or more inorganic-compound phases. The one or more inorganic-compound phases include a metal-silicide phase, a metal-silicocarbide phase, or both.

Additional aspects of the present invention are directed to applications utilizing the disclosed superabrasive elements in various articles and apparatuses, such as superabrasive compacts, superabrasive cutting elements, rotary drill bits, machining equipment, bearing apparatuses, wire-drawing dies, and other articles and apparatuses.

BRIEF DESCRIPTION OF THE DRAWINGS

The drawings illustrate various embodiments of the present invention, wherein like reference numerals refer to like or similar elements in different views or embodiments shown in the drawings.

DETAILED DESCRIPTION OF VARIOUS EMBODIMENTS

Various embodiments of the present invention are directed to superabrasive elements (e.g., PCD elements) including a binder constituent that is made predominantly of one or more inorganic-compound phases. Methods of fabricating such superabrasive elements and applications utilizing such superabrasive elements are also disclosed. The superabrasive elements disclosed herein may be used in a variety of applications, such as drilling tools (e.g., compacts, cutting elements, gage trimmers, etc.), machining equipment, bearing apparatuses, wire-drawing machinery, and other apparatuses. As used herein, the term "superabrasive" means a material that exhibits a hardness exceeding a hardness of tungsten carbide. For example, a superabrasive layer is a layer that exhibits a hardness exceeding the hardness of tungsten carbide.

Figure 1A:
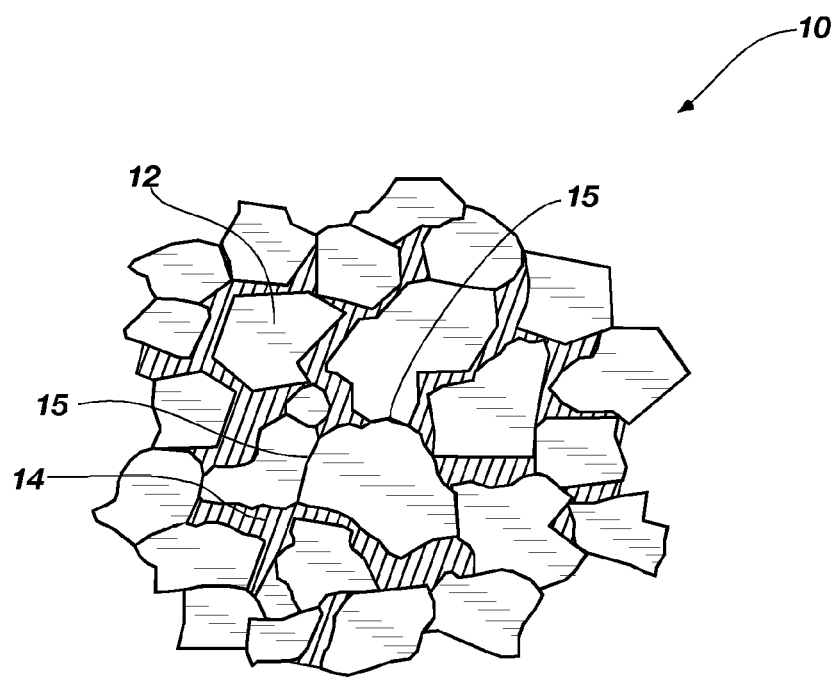
FIG. 1A is a partial, schematic microstructural representation of a superabrasive element according to various embodiment of the present invention.

FIG. 1A is a partial, schematic microstructural representation of an HPHT sintered, superabrasive element 10 according to various embodiments of the present invention. The superabrasive element 10 includes a plurality of superabrasive grains 12, such as diamond grains (also known as diamond crystals), cubic boron nitride grains, or mixtures thereof. The superabrasive grains 12 are bonded together, predominately, by a binder constituent 14. Although the superabrasive grains 12 may be generally free of direct bonding between adjacent superabrasive grains 12, in some embodiments of the present invention, a portion of the superabrasive grains 12 may also be bonded to each other to form grain boundaries 15 therebetween. The binder constituent 14 may be present in the superabrasive element 10 in an amount from about 5 to about 55 percent by weight. However, depending upon the volume fraction of the binder constituent 14 in the superabrasive element 10, the binder constituent 14 may form a substantially continuous matrix as shown in FIG.

1B and the superabrasive grains 12 may be distributed through the substantially continuous matrix. In either of the microstructures shown in FIGS. 1A and 1B, the binder constituent 14 bonds adjacent superabrasive grains 12 together, and fills interstitial regions created by the arrangement of the superabrasive grains 12 to form a dense, coherent mass of superabrasive material.

A variety of different types of materials may be used for the binder constituent 14 of the superabrasive element 10. In certain embodiments of the present invention, the binder constituent 14 may predominantly comprise a number of different inorganic-compound phases, such as boron-compound phases and silicon-compound phases that may be formed in situ during HPHT sintering. However, the binder constituent 14 may also include small amounts of non-inorganic-compound phases, such as metallic phases.

In certain embodiments of the present invention, the binder constituent 14 is predominantly made from one or more of the following inorganic-compound phases: a metal-boride phase, a metal-borocarbide phase, and a metal-carbide phase. However, small amounts of non-inorganic-compound phases may be present. The binder constituent 14 may be completely or almost completely formed of such inorganic-compound phases and such inorganic-compound phases may comprise about 5 to about 55 percent by weight of the superabrasive element 10. The metal-borocarbide and the metal-carbide phases may be present in the superabrasive element 10 when at least a portion of the superabrasive grains 12 include diamond grains as a result of a chemical reaction between the binder constituent 14 precursor constituents and/or carbon from the diamond grains. The metal-boride phase, metal-carbide phase, and metal-borocarbide phase, may be borides, carbides, and borocarbides of titanium, iron, cobalt, nickel, zirconium, niobium, molybdenum, tantalum, tungsten, and combinations thereof.

In one specific embodiment of the present invention, the inorganic-compound phases of the binder constituent 14 include titanium boride, titanium carbide ("TiC"), and titanium borocarbide, the precise stoichiometry of the inorganic-compound phases varying depending upon the HPHT sintering processing conditions and the relative ratios of titanium and boron in the binder constituent precursor materials. However, the titanium boride phase, typically, is titanium di-boride ("$TiB_2$"). The titanium carbide and titanium borocarbide phases may be located adjacent to and bonded to diamond grains of the superabrasive diamond grains 12, and the carbon of the titanium carbide phase and titanium borocarbide phase are provided by the diamond grains. The presence of titanium carbide in the binder constituent 14 may increase the fracture toughness of the superabrasive element 10 at the temperatures commonly experienced during drilling operations because TiC undergoes a brittle-to-ductile transition at temperatures above about 800° Celsius.

In other embodiments of the present invention, the inorganic-compound phases of the binder constituent 14 predominantly comprise one or more of the following inorganic-compound phases: a metal-silicide phase, a metal-silicocarbide phase, and a metal-carbide phase. However, small amounts of non-inorganic-compound phases may be present. The binder constituent 14 may be completely or almost completely formed of such inorganic-compound phases and such inorganic-compound phases may comprise about 5 to about 55 percent by weight of the superabrasive element 10. The metal-silicocarbide and the metal-carbide phases may be present in the superabrasive element 10 when at least a portion of the superabrasive grains 12 include diamond grains as a result of a chemical reaction between the binder constituent 14 precursor constituents and carbon from the diamond grains. The metal-silicide phase, metal-carbide phase, and metal-silicocarbide phase, may be silicides, carbides, and/or silicocarbides of titanium, iron, cobalt, nickel, zirconium, niobium, molybdenum, tantalum, and tungsten.

In another specific embodiment of the present invention, the inorganic-compound phases of the binder constituent 14 include titanium silicide, silicon carbide, and/or titanium silicocarbide, the precise stoichiometry of the inorganic-compound phases varying depending upon the HPHT sintering processing conditions and the relative ratios of titanium and silicon in the binder constituent 14 precursor materials. Examples of titanium silicides, silicon carbides, and/or titanium silicocarbides are $TiSi_2$, SiC, and $Ti_3SiC_2$, respectively. The silicon carbide phase and the titanium silicocarbide phase may be located adjacent to and bonded to diamond grains of the superabrasive grains 12. According to various embodiments of the present invention, SiC may comprise about 5 to about 30 percent by weight, $TiSi_2$ may comprise about 1 to about 15 percent by weight, $Ti_3SiC_2$ may comprise about 1 to about 15 percent by weight, and diamond grains comprise the balance of the superabrasive element 10. Thus, the silicon carbide phase may form over 50 percent by weight of the binder constituent 14. The relatively high fracture toughness and relatively low coefficient of thermal expansion of $Ti_3SiC_2$ compared to most inorganic compounds may improve the fracture toughness and thermal stability of the superabrasive element 10.

In another specific embodiment of the present invention, the silicide phase, carbide phase, and/or the silicocarbide phase may be molybdenum silicide, silicon carbide, and molybdenum silicocarbide, respectively. For example, the binder constituent 14 may include one or more of the following phases: $MoSi_2$, $Mo_5Si_3$, $Mo_{24}Si_{15}C_3$, and SiC. The presence of the $MoSi_2$ phase in the binder constituent 14 may increase the fracture toughness of the superabrasive element 10 at the temperatures commonly experienced during drilling operations because $MoSi_2$ undergoes a brittle-to-ductile transition at temperatures above 1000° Celsius. In some embodiments of the present invention, aluminum may be added to the binder constituent 14 in small amounts (e.g., about 1 to about 5 percent by weight of the binder constituent 14), which may increase the toughness of the $MoSi_2$ phase.

Generally described, processes for fabricating the superabrasive element 10 according to various embodiments of the present invention may employ particulate constituents such as a particulate mixture of metallic particles, boron-containing and/or silicon-containing particles, and superabrasive particles. Such particulate constituents may be aggressively mixed together using mechanical milling techniques and HPHT sintered together. Other disclosed processes at least partially coat the superabrasive particles with a metallic constituent, and/or a silicon-containing or a boron-containing constituent by a deposition technique or as a result of the aggressive milling techniques, followed by HPHT sintering.

Generally, diamond particles or other superabrasive particles may exhibit one or more selected size. Explaining further, in embodiments of the present invention, diamond particles or other superabrasive particles may exhibit a selected size, such size determined, for example, by passing the diamond particles or other superabrasive particles through one or more sizing sieve or by any other method. In one embodiment of the present invention, the diamond particles or other superabrasive particles may include a relatively larger size and at least one relatively smaller size. As used herein, the phrases "relatively larger" and "relatively smaller" refer to particle sizes (by any suitable method) that differ by at least a factor of two (e.g., 40 μm and 20 μm). More particularly, in various embodiments of the present invention, the diamond particles or other superabrasive particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In another embodiment of the present invention, the diamond particles or other superabrasive particles may include a portion exhibiting a relatively larger size between about 40 μm and about 15 μm and another portion exhibiting a relatively smaller size between about 12 μm and 2 μm. Of course, three or more different sizes (e.g., one relatively larger size and two or more relatively smaller sizes) may comprise diamond particles or other superabrasive particles, without limitation. One of ordinary skill in the art will appreciate that many suitable variations and combinations are contemplated by the present invention.

Figure 1B:
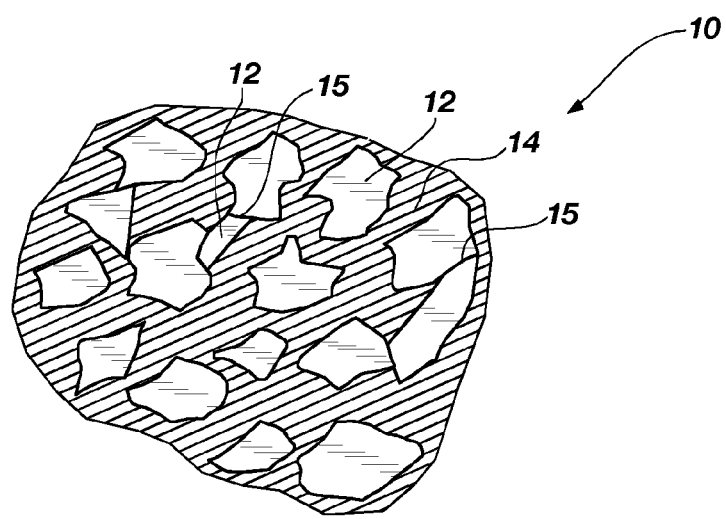
FIG. 1B is a partial, schematic microstructural representation of a superabrasive element according to various embodiment of the present invention in which the superabrasive grains are distributed throughout a substantially continuous binder constituent composed predominately of one or more inorganic-compound phases.
Figure 2:
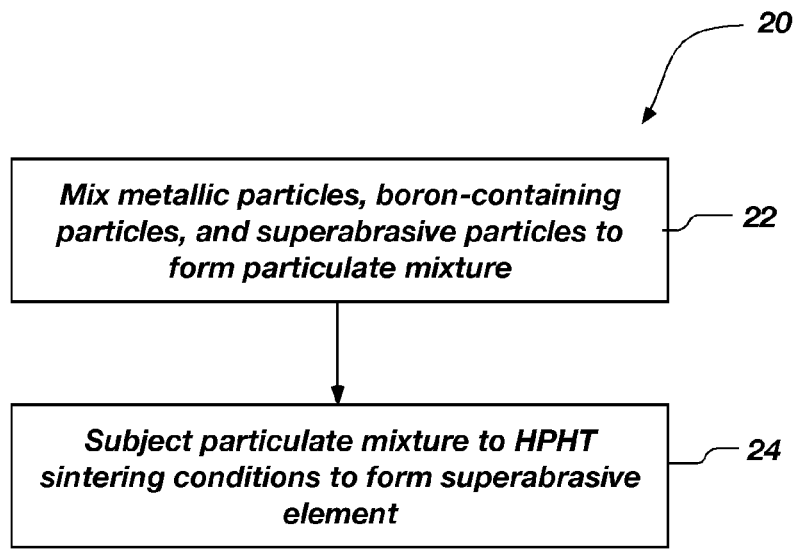
FIG. 2 is a flow diagram of one embodiment of a process according to the present invention for fabricating a superabrasive element including a binder constituent that comprises metal-boride phases, metal-borocarbide phases, or both.

FIG. 2 shows one embodiment of a process 20, according to the present invention, for fabricating the superabrasive element 10 in which the binder constituent 14 includes borides, borocarbides, or both. In process act 22, metallic particles, boron-containing particles, and superabrasive particles (e.g., diamond particles having an average size of about 0.5 μm to about 150 μm) are mixed together to form a particulate mixture. The particulate mixture may be formed, for example, by aggressively mixing the metallic particles, boron-containing particles, and superabrasive particles using a high-energy ball mill or an attrition mill under an inert atmosphere such as argon. The milling process may form superabrasive particles that are at least partially coated or smeared with a coating comprising the metallic particles and the boron-containing particles. In one embodiment of the present invention, such a coating may comprise a mechanically-alloyed coating including at least one or two constituents of the binder constituent. For example, titanium particles, boron particles, and diamond particles may be mixed together using a high-energy ball mill to form diamond particles coated or smeared with a mechanically alloyed titanium-boron alloy as a result of mechanical alloying between the titanium and boron particles. Next, in process act 24, the particulate mixture is subjected to an HPHT sintering process to form the superabrasive element 10 with a microstructure including the superabrasive grains 12 bonded together with the binder constituent 14 as shown in FIGS. 1A and 1B.

In order to efficiently sinter the particulate mixture, the particulate mixture may be placed in a pressure transmitting medium, such as a refractory metal can, graphite structure, pyrophyllite and/or other pressure transmitting structure, or another suitable container or supporting element. Methods and apparatuses for sealing enclosures suitable for holding the particulate mixture are disclosed in U.S. patent application Ser. No. 11/545,929, which is incorporated herein, in its entirety, by this reference. The pressure transmitting medium, including the particulate mixture, is subjected to an HPHT process using an ultra-high pressure press at a temperature of at least about 1000° Celsius (e.g., about 1100° Celsius to about 2200° Celsius) and a pressure of at least about 40 kilobar (e.g., about 50 kilobar to about 80 kilobar) for a time sufficient to sinter and form the superabrasive element 10.

The metallic particles of the particulate mixture may be made from materials, such as titanium, iron, cobalt, nickel, zirconium, niobium, molybdenum, tantalum, tungsten, alloys thereof, hydrides thereof, and any combination of the preceding materials. Small amounts of aluminum particles may also be added to the particulate mixture. Typically, the metallic particles may be in the form of commercially pure, elemental metal powders. However, alloy powders may also be used. At least a portion of the metallic particles may also include metal-hydride particles to facilitate the removal of oxides and other impurities present in the particulate mixture during the HPHT sintering process. Additionally, the boron-containing particles may also be in the form of elemental boron powder or boron compounds, such as boron carbide (i.e., $B_4C$), exhibiting a suitable purity.

During the HPHT sintering process, the metallic particles, the boron-containing particles, and, if present, the diamond particles chemically react to form the binder constituent 14. As previously alluded to above, the resultant inorganic-compound phases present in the binder constituent 14 depends upon the chemistry of the particulate mixture and the temperature, pressure, and time conditions used in the HPHT sintering process. In one embodiment of the present invention, when the metallic particles include elemental titanium or an alloy of titanium and the superabrasive particles include diamond particles, the inorganic-compound phases may include titanium di-boride, titanium carbide, and titanium borocarbide. In such an embodiment, the sintering temperature may be selected to be at least about 1700° Celsius to ensure reaction between the titanium particles and the boron-containing particles to form titanium di-boride.

In situ forming the inorganic-compound phases of the binder constituent 14 enables performing the sintering at a relatively lower temperature. Solid-state sintering a mixture of the superabrasive particles and prefabricated binder portions composed of the inorganic-compound phases can result in a less dense superabrasive material exhibiting weaker mechanical properties (i.e., hardness, fracture toughness, wear resistance, etc.) in comparison to when HPHT sintering process conditions are employed. Thus, the resultant superabrasive element 10 fabricated in accordance with the various embodiments of the present invention may exhibit different physical and mechanical properties than a superabrasive element fabricated using prefabricated binder portions, such as $TiB_2$. Additionally, if liquid phase sintering were employed using prefabricated binder portions composed of the inorganic-compound phases, the sintering temperature would have to be significantly higher in order to at least partially melt the inorganic-compound phases.

In some embodiments of the present invention, reactive liquid sintering may be employed to facilitate the chemical reaction among constituents of the particulate mixture. The particulate mixture may be sintered at a temperature above a eutectic temperature of the chemical system of the metal element of the metallic particles and the boron of the boron-containing particles to partially melt or completely melt the metallic particles and/or the boron-containing particles. For example, the metallic particles may include elemental titanium and the boron-containing particles may include elemental boron. In such a case, the chemical system of titanium and boron exhibits a eutectic temperature, and carbon from diamond particles or another source may alter the eutectic temperature. The as-sintered microstructure of the binder constituent 14 may exhibit microstructural and/or mechanical characteristics indicative of reactive liquid phase sintering being employed for fabricating the superabrasive element 10. Additionally, the resultant density of the superabrasive element 10 may be significantly greater.

In another embodiment of the present invention, the superabrasive particles may be coated via a deposition process (e.g., a chemical-vapor-deposition ("CVD") process or a physical-vapor-deposition ("PVD") process with a boron constituent and/or a metallic constituent (i.e., titanium, iron, cobalt, nickel, zirconium, niobium, molybdenum, tantalum, tungsten, alloys thereof, and any combination of the preceding materials). For example, the superabrasive particles may be at least partially or completely coated with boron, mixed with metallic particles, and HPHT sintered using the previously-mentioned HPHT process conditions to form the superabrasive element 10.

Figure 3:
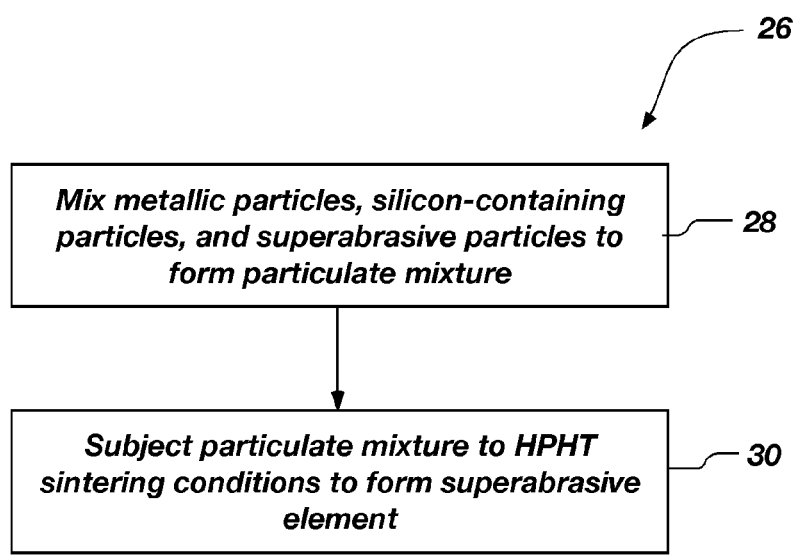
FIG. 3 is a flow diagram of another embodiment of a process according to the present invention for fabricating a superabrasive element including a binder constituent that comprises metal-silicide phases, metal-silicocarbide phases, or both.

FIG. 3 shows another embodiment of a process 26, according to the present invention, for fabricating the superabrasive element 10 in which the binder constituent 14 includes silicides, silicocarbides, or both. In process act 28, metallic particles, silicon-containing particles, and superabrasive particles (e.g., diamond particles having an average size of about 0.5 μm to about 150 μm) are mixed together to form a particulate mixture. As with the process 20 shown in FIG. 2, the particulate mixture may be formed, for example, by aggressively mixing the metallic particles, silicon-containing particles, and superabrasive particles using a high-energy ball mill or an attrition mill under an inert atmosphere such as argon. In addition to at least partially coating or smearing the superabrasive grains, the aggressive milling process may transform all or some of any crystalline silicon present in the silicon-containing particles, if any, to amorphous silicon. As with the process 20 shown in FIG. 2, the metallic particles of the particulate mixture may be made from materials such as titanium, iron, cobalt, nickel, zirconium, niobium, molybdenum, tantalum, tungsten, alloys thereof, hydrides thereof, and any combination of the preceding materials. Small amounts of aluminum particles may also be added to the particulate mixture. Additionally, the silicon-containing particles may also be elemental silicon powder of a suitable purity in crystalline and/or amorphous form. Next, in process act 30, the particulate mixture is subjected to an HPHT sintering process using temperature, pressure, and time conditions similar to the conditions employed in the process 20 shown in FIG. 2 to form the binder constituent 14 that bonds adjacent superabrasive grains 12 together.

During the HPHT sintering process, the metallic particles, the silicon-containing particles, and, if present, the diamond particles react to form the binder constituent 14. As previously discussed, the resultant phases present in the binder constituent 14 depends upon the chemistry of the particulate mixture and the temperature, pressure, and time conditions used in the HPHT sintering process. For example, when the metallic particles are made from elemental titanium or an alloy of titanium and the superabrasive particles include diamond particles, the in situ formed inorganic-compound phases include titanium silicides, silicon carbides, and titanium silicocarbides, such as $TiSi_2$, SiC, and $Ti_3SiC_2$. When the metallic particles of the particulate mixture include elemental molybdenum or an alloy of molybdenum and the superabrasive particles include diamond particles, the inorganic-compound phases include all or some of the following phases: $MoSi_2$, $Mo_5Si_3$, $Mo_{24}Si_{15}C_3$, and SiC. In such an embodiment, the sintering temperature may be selected to be at least about 1400° Celsius to ensure reaction between the molybdenum particles and the silicon-containing particles.

Again, solid-state sintering a mixture of the superabrasive particles and prefabricated binder portions composed of the inorganic-compound phases can result in a less dense superabrasive element exhibiting weaker mechanical properties (i.e., hardness, fracture toughness, wear resistance, etc.) in comparison to when HPHT sintering process conditions are employed. Thus, the resultant superabrasive element 10 fabricated in accordance with the various embodiments of the present invention may exhibit different physical and mechanical properties than a superabrasive element fabricated using prefabricated binder portions composed of $TiSi_2$, TiC, $Ti_3SiC_2$, $MoSi_2$, $Mo_5Si_3$, and $Mo_{24}Si_{15}C_3$.

As with the process 20 shown in FIG. 2, in some embodiments of the present invention, reactive liquid sintering may be employed to facilitate the chemical reaction among the constituents of the particulate mixture. The particulate mixture may be sintered at a temperature above a eutectic temperature of the chemical system of the metal element from the metallic particles and the silicon from the silicon-containing particles to partially or completely melt the metallic particles and the silicon-containing particles. For example, the metallic particles may include elemental titanium and the silicon-containing particles may include elemental silicon. In such a case, the chemical system of titanium and silicon exhibits a eutectic temperature, and carbon from diamond particles or another source may alter the eutectic temperature. Again, the as-sintered microstructure of the binder constituent 14 may exhibit microstructural and/or mechanical characteristics indicative of reactive liquid phase sintering being employed for fabricating the superabrasive element 10.

In another embodiment of the present invention, the superabrasive particles may be coated via a deposition process (e.g., a CVD process or a PVD process) with a silicon constituent and/or a metallic constituent (i.e., titanium, iron, cobalt, nickel, zirconium, niobium, molybdenum, tantalum, tungsten, alloys thereof, and any combination of the preceding materials). For example, the superabrasive particles may be at least partially or completely coated with silicon, mixed with metallic particles, and HPHT sintered using the previously-mentioned HPHT process conditions to form the superabrasive element 10.

Figure 4:
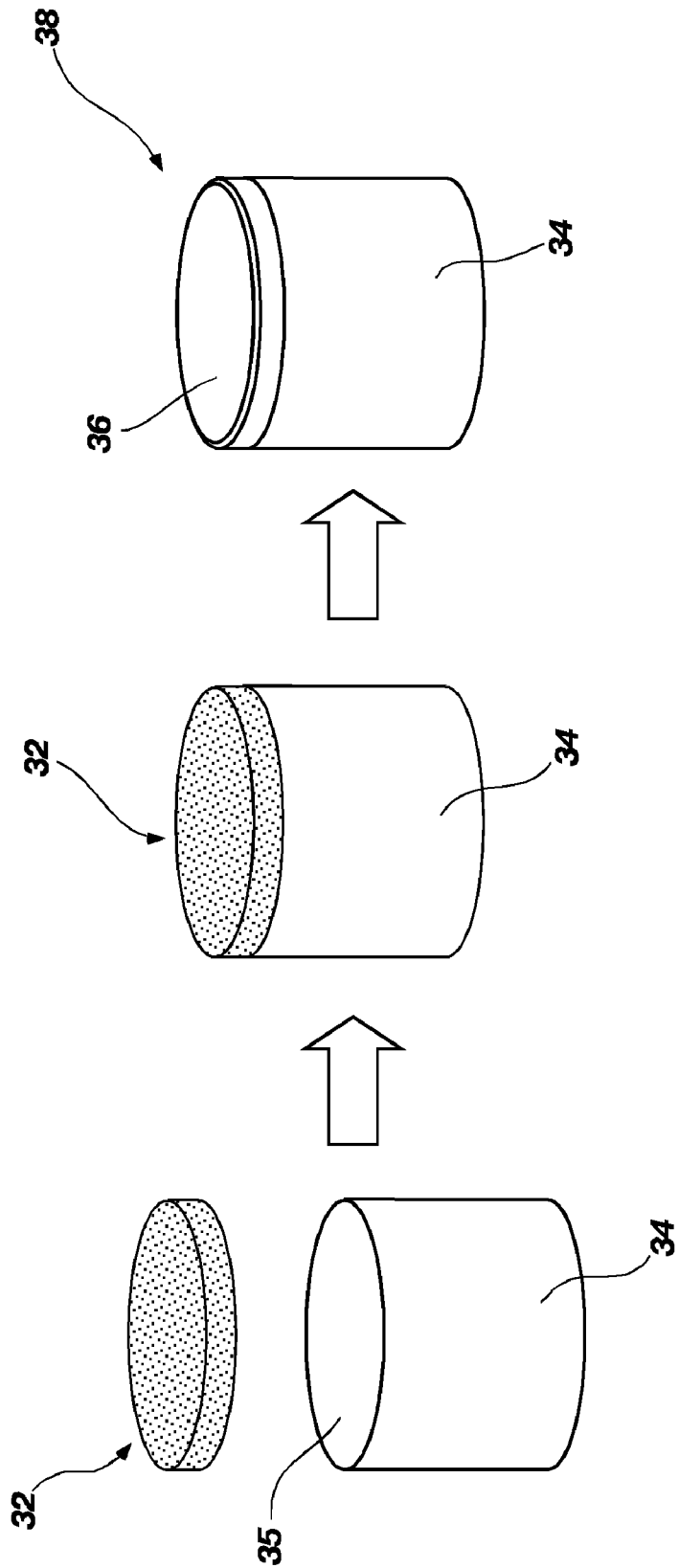
FIG. 4 is a schematic diagram illustrating a method for fabricating a superabrasive element on a substrate to form a superabrasive compact according to one embodiment of the present invention.

In many applications, it may be desirable to configure the superabrasive element 10 as a superabrasive table formed on or bonded to a substrate. FIG. 4 shows a schematic illustration of a process for fabricating any of the superabrasive elements disclosed herein on a substrate or bonding such a superabrasive element to a substrate to form a superabrasive compact suitable for use as a superabrasive cutting element or a bearing element. As shown in FIG. 4, a particulate mixture 32 (i.e., metallic particles, superabrasive particles, and boron and/or silicon-containing particles) is positioned adjacent to an interfacial surface 35 of a suitable substrate 34. The substrate 34 may be generally cylindrical or another selected configuration, without limitation. Although FIG. 4 shows the interfacial surface 35 as being substantially planar, the interfacial surface 35 may exhibit a selected nonplanar topography, without limitation. The substrate 34 may include a metal-solvent catalyst, such as cobalt in a cobalt-cemented tungsten carbide or another suitable material. Other materials that may be used for the substrate 34 include, without limitation, cemented carbides including titanium carbide, niobium carbide, tantalum carbide, vanadium carbide, and combinations of any of the preceding carbides cemented with cobalt, iron, nickel, or alloys thereof. The mixture 32 and the substrate 34 may be subjected to an HPHT sintering process to form a superabrasive compact 38 including a superabrasive table 36 bonded to the interfacial surface 35 of the substrate 34. If the substrate 34 includes a metal-solvent catalyst, the metal-solvent catalyst may infiltrate a region of the mixture 32 adjacent to the substrate 34 so that most of the superabrasive grains in this region are directly bonded together with interstitial regions therebetween occupied by the metal-solvent catalyst, binder constituent 14, or both. Thus, the microstructure of the superabrasive table 36 may predominately exhibit direct bonding between adjacent superabrasive grains 12 in the region adjacent the substrate 34 (i.e., forming a polycrystalline-diamond structure), while a region remote from the substrate 34 may exhibit a microstructure, similar to the microstructure shown in FIGS. 1A and 1B (i.e., wherein the binder constituent 14 extends between a majority of adjacent superabrasive grains 12).

In other embodiments of the present invention, the superabrasive table 36 may be separately formed using an HPHT sintering process and, subsequently, bonded to the interfacial surface 35 of the substrate 34 by brazing, using a separate HPHT bonding process, or any other suitable joining technique, without limitation. Again, when the substrate 34 includes a metal-solvent catalyst, such as cobalt in a cobalt-cemented tungsten carbide substrate, the microstructure of the superabrasive table 36 may exhibit direct bonding between adjacent superabrasive grains 12 in the region adjacent the substrate 34, while a region remote from the substrate 34 may exhibit a microstructure, similar to the microstructure shown in FIGS. 1A and 1B (i.e., wherein the binder constituent 14 extends between a majority of adjacent superabrasive grains 12).

Figure 5:
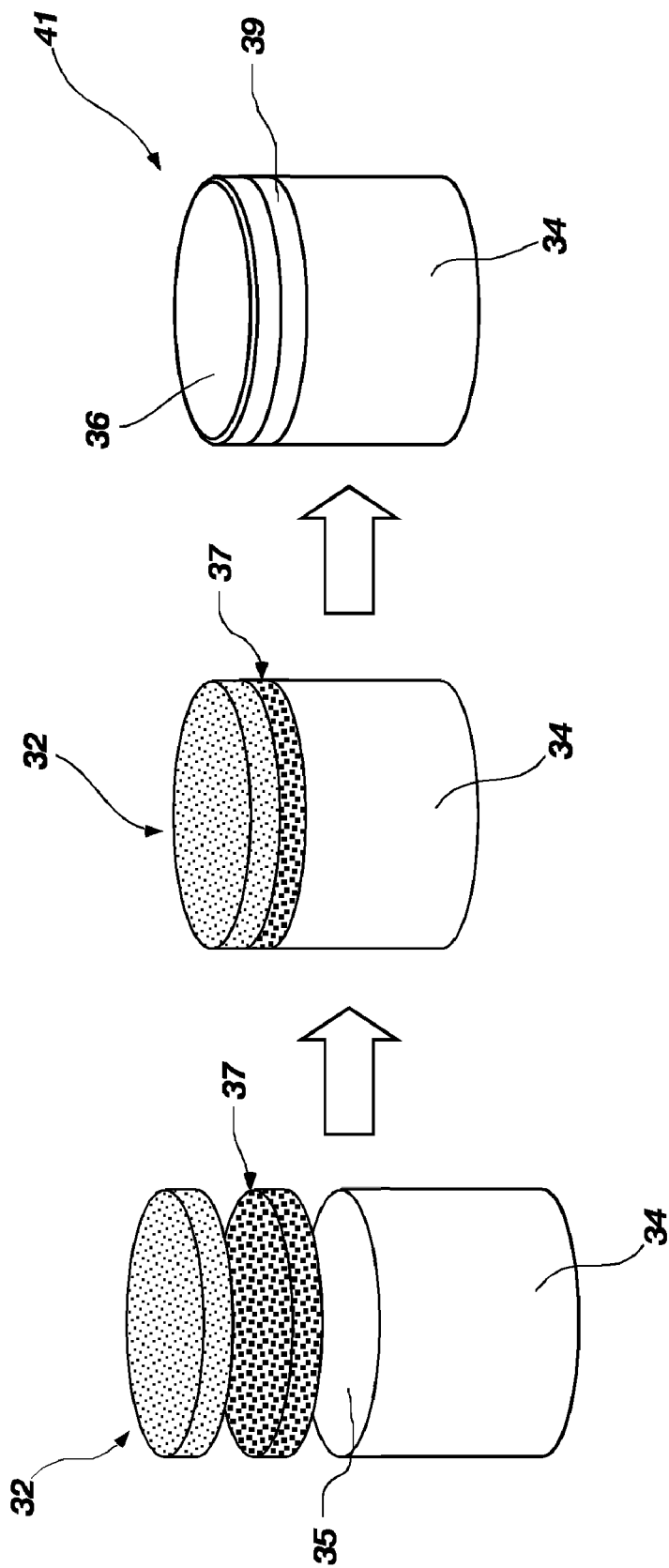
FIG. 5 is a schematic diagram illustrating a method for fabricating a superabrasive element on a substrate to form a superabrasive compact according to another embodiment of the present invention.

FIG. 5 shows another embodiment of the present invention for forming a superabrasive compact in which an intermediate layer of diamond is disposed between the substrate 34 and the superabrasive table 36. As shown in FIG. 5, a layer of un-sintered diamond particles 37 is positioned on or adjacent to the interfacial surface 35 of the substrate 34. The particulate mixture 32 is layered adjacent to the layer of diamond particles 37. The mixture 32, layer of diamond particles 37, and substrate 34 are subjected to an HPHT sintering process to form a superabrasive compact 41 including an intermediate diamond table 39 bonded to the superabrasive table 36 and the substrate 34.

The layer of diamond particles 37 may also include other constituents such as a metal-solvent catalyst or a layer of metal-solvent catalyst may be disposed between the layer of diamond particles 37 and the interfacial surface 35 of the substrate 34. In some embodiments of the present invention, the substrate 34, such as a cobalt-cemented tungsten carbide substrate, may provide the metal-solvent catalyst, which sweeps into the layer of diamond particles 37 during the HPHT sintering process. The layer of diamond particles 37 may also include the same or similar type of metallic particles present in the particulate mixture 32. For example, when the particulate mixture 32 includes titanium particles for forming borides and borocarbides of titanium or silicides and silicocarbides of titanium, titanium particles may be included in the layer of diamond particles 37. The concentration of titanium in the layer of diamond particles 37 may be less than that of the concentration of titanium present in the particulate mixture 32, which may provide a titanium concentration gradient that assists with bonding the superabrasive table 36 securely to the substrate 34.

If a metal-solvent catalyst is used to form the diamond table 39, some of the metal-solvent catalyst may also infiltrate into the particulate mixture 32 so that, upon HPHT sintering, a region of the superabrasive table 36 adjacent to the diamond table 39 may exhibit a microstructure with relatively more direct bonding between adjacent superabrasive grains 12 than that of the remaining region of the superabrasive table 36. Thus, the microstructure of the superabrasive table 36 may predominately exhibit direct bonding between adjacent superabrasive grains 12 in the region adjacent the diamond table 39, while a region remote from the diamond table 39 may exhibit a microstructure, similar to the microstructure shown in FIGS. 1A and 1B (i.e., wherein the binder constituent 14 extends between a majority of adjacent superabrasive grains 12).

Instead of HPHT sintering the layer of diamond particles 37, particulate mixture 32, and substrate 34 together, in another embodiment of the present invention, the particulate mixture 32 may be separately HPHT sintered to form a free-standing superabrasive table 36. The separately formed superabrasive table 36 may be subsequently HPHT bonded or otherwise bonded to an upper surface of the diamond table 39 carried on the substrate 34.

Figure 6:
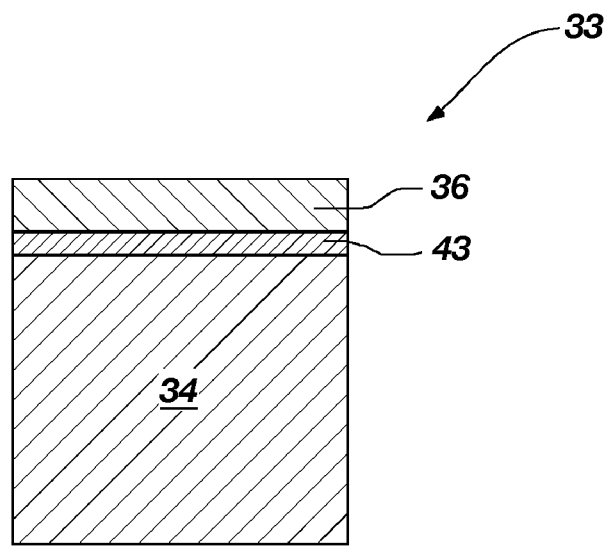
FIG. 6 is a side cross-sectional view of a superabrasive compact including a barrier layer disposed between a superabrasive table and a substrate according to another embodiment of the present invention.
Figure 7:
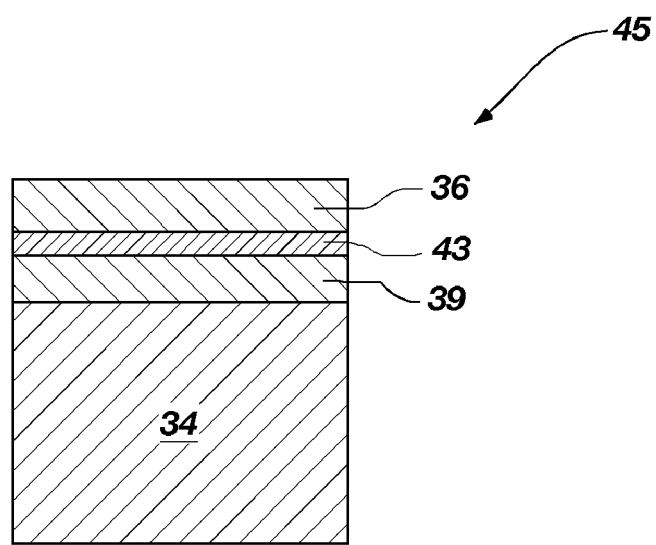
FIG. 7 is a side cross-sectional view of a superabrasive compact including a barrier layer disposed between a PCD table and a superabrasive table according to another embodiment of the present invention.

FIG. 6 shows another embodiment of the present invention in which a barrier material may be disposed between the substrate 34 and the particulate mixture 32 or the layer of diamond grains 37 and the particulate mixture 32. Upon HPHT sintering, a superabrasive compact 33 is formed that includes a barrier layer 43 disposed between the substrate 34 and the superabrasive table 36. FIG. 7 shows yet another embodiment of the present invention in which a superabrasive compact 45 includes the barrier layer 43 disposed between the intermediate diamond table 39 and the superabrasive table 36. In the superabrasive compacts 33 and 45 shown in FIGS. 6 and 7, the barrier layer 43 may be made from a refractory material, such as niobium, tantalum, vanadium, molybdenum, tungsten, zirconium, and alloys thereof. Such a configuration may reduce or prevent silicon, which may be present in the superabrasive table 36 in certain embodiments, from diffusing into the substrate 34. Silicon can embrittle the bond between the superabrasive table 36 and the substrate 34 (FIG. 6) and the intermediate diamond table 39 and the substrate 34 (FIG. 7). Additionally, the barrier layer 43 may reduce or substantially prevent any metal-solvent catalyst, if present, from infiltrating into the superabrasive table 36 from the substrate 34 or the diamond table 39 during HPHT sintering.

The barrier layer 43 may be formed by disposing a thin barrier material between the substrate 34 and the particulate mixture 32. For example, the particulate mixture 32 may be held in a first can made from a suitable refractory material, with the first can placed adjacent to the substrate 34. The assembly of the first can, including the particulate mixture 32 therein, and the substrate 34 may be placed in a second can made from a suitable refractory material and subjected to an HPHT sintering process. The HPHT processed assembly may be ground to remove peripheral portions of the first and second refractory cans, leaving the barrier layer 43 between the substrate 34 and the superabrasive table 36. In another embodiment of the present invention, the barrier layer 43 may be formed by disposing a thin disc of suitable refractory material between the substrate 34 and the particulate mixture 32.

Although the various embodiments of processes according to the present invention for fabricating superabrasive elements and compacts have been described as forming particulate mixtures of, for example, titanium particles, silicon particles, and superabrasive particles, there are number of alternative embodiments for fabricating the superabrasive elements and compacts. In other embodiments of the present invention, instead of forming a particulate mixture of metallic particles, boron-containing particles, and superabrasive particles (e.g., as in the process 20 shown in FIG. 2) or metallic particles, silicon-containing particles, and superabrasive particles (e.g., as in the process 26 shown in FIG. 3), discrete individual layers of each of the constituents may be formed. For example, a superabrasive element may be fabricated by positioning a first layer of silicon-containing particles or boron-containing particles adjacent to a second layer of unsintered superabrasive particles. A third layer of metallic particles may be positioned adjacent to the first layer of silicon-containing particles or boron-containing particles. The assembly of the first, second, and third layers may be subjected to an HPHT sintering process to melt the constituents of the first and third layers to infiltrate the layer of superabrasive particles and form a binder constituent that encapsulates superabrasive grains. Additionally, in yet another alternative embodiment of the present invention, a layer including silicon-containing particles or boron-containing particles mixed with the metallic particles may be positioned adjacent to a layer of unsintered superabrasive particles and HPHT sintered. Moreover, any of the above-described, alternative embodiments may be used to form a superabrasive element bonded to a substrate to construct a superabrasive compact.

A superabrasive element fabricated according to various embodiments of the present invention provides a more thermally stable superabrasive element compared to a conventional PDC including a polycrystalline-diamond table including a metal-binder catalyst, such as cobalt. Additionally, the superabrasive elements disclosed herein do not require leaching the binder constituent from a region of the superabrasive element to improve thermal stability. This is because the binder constituent, which are predominantly made from inorganic-compound phases, are not believed to adversely affect the thermal stability of diamond present in the superabrasive element to an extent conventional binder catalysts adversely affect the thermal stability of polycrystalline diamond present in a conventional PDC. Accordingly, the superabrasive elements disclosed herein provide a relatively more thermally stable superabrasive element without employing time consuming and tedious binder removal processes, such as acid leaching. Additionally, since many of the inorganic-compound phases (e.g., $MoSi_2$, $Ti_3SiC_2$, and $TiB_2$) present within the binder constituent of the superabrasive elements disclosed herein exhibit at least a nominal electrical conductivity, the superabrasive elements may be cut to a selected shape using wire-electrical-discharge machining ("wire EDM") or another EDM process.

Figure 8:
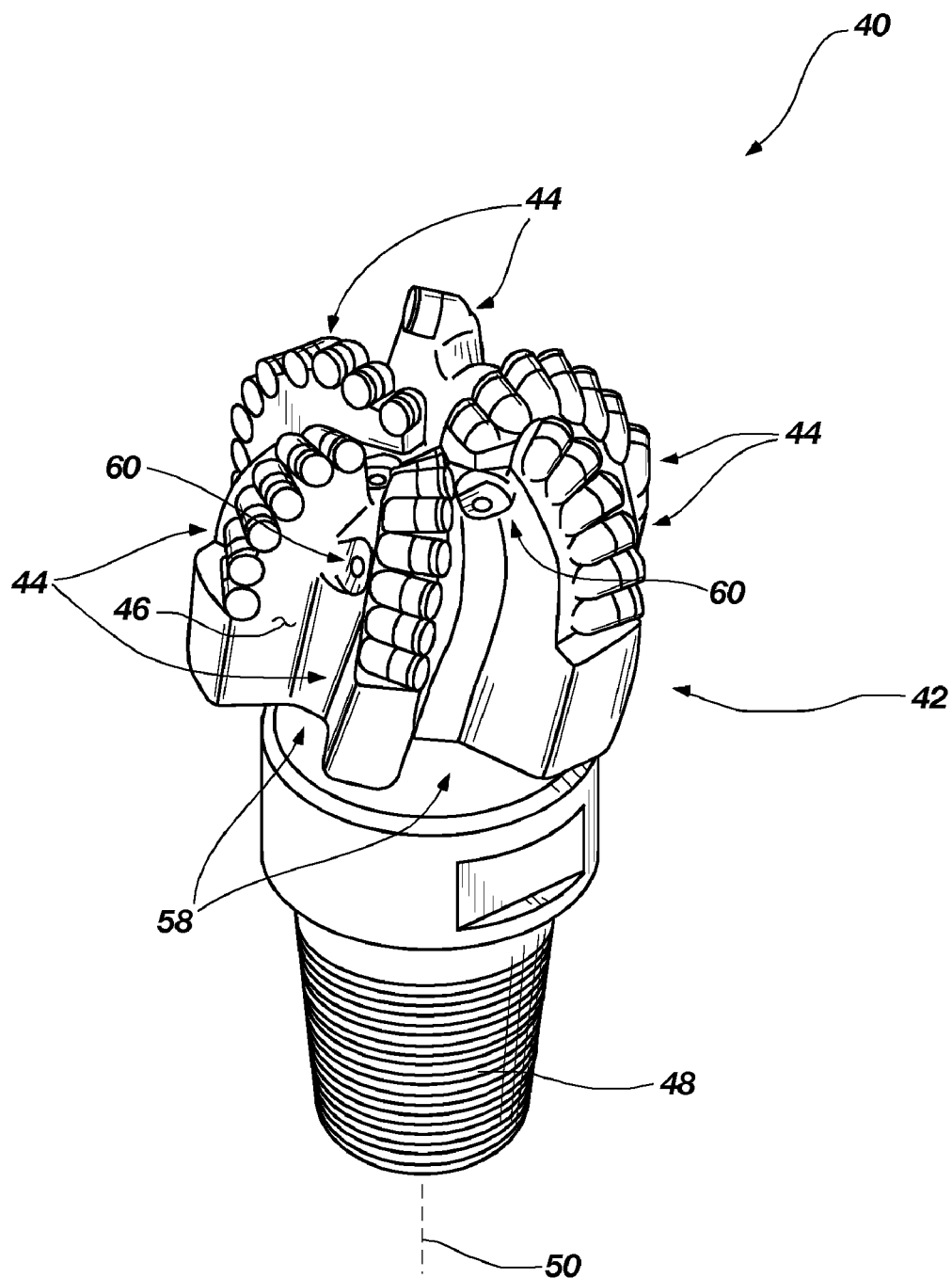
FIG. 8 is an isometric view of one embodiment of a rotary drill bit including at least one superabrasive cutting element including a superabrasive element or compact configured according any of the various superabrasive element or compact embodiments of the present invention.
Figure 9:
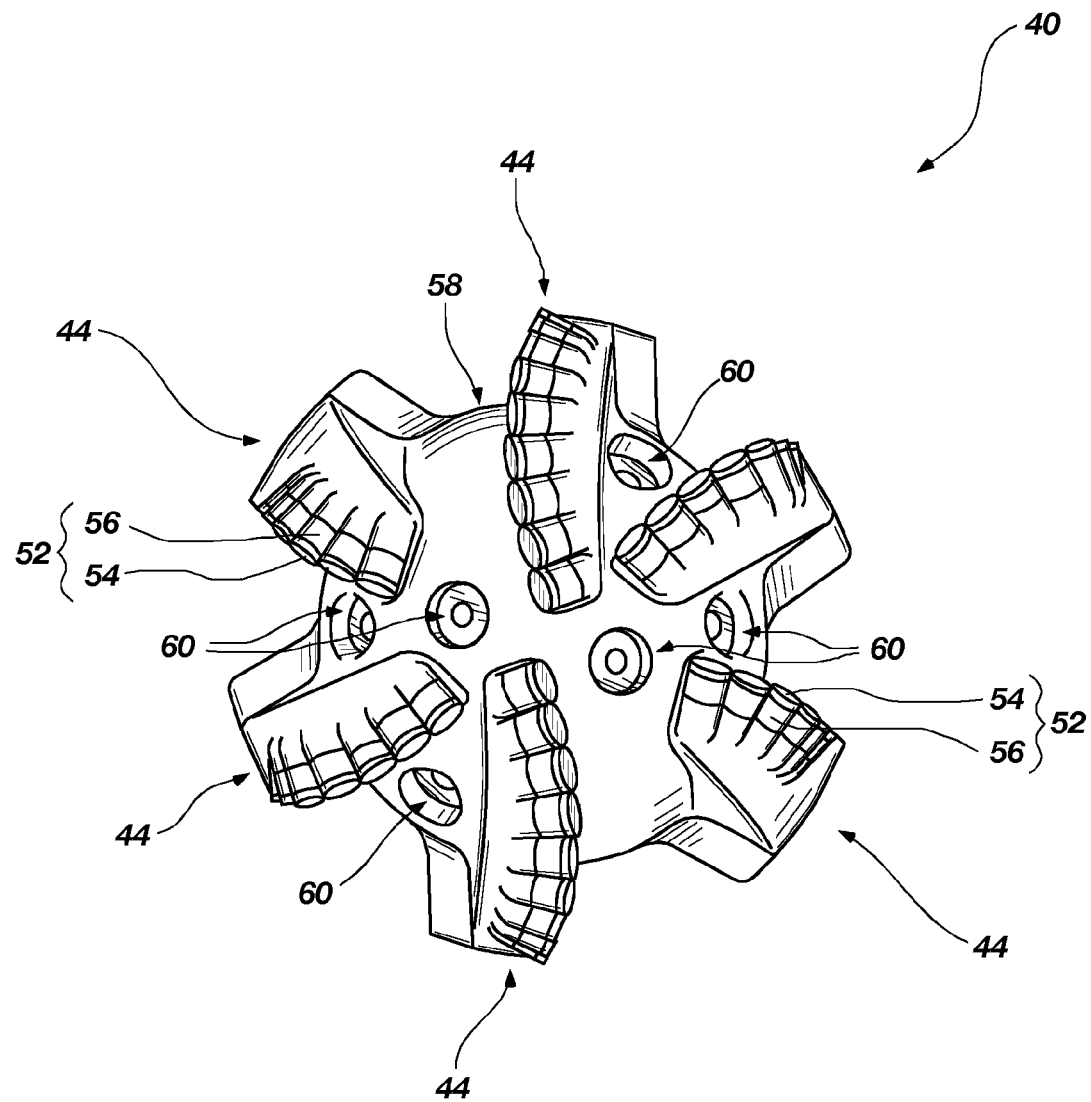
FIG. 9 is a top elevation view of the rotary drill bit of FIG. 8.

FIGS. 8 and 9 show an isometric view and a top elevation view, respectively, of a rotary drill bit 40 according to one embodiment of the present invention. The rotary drill bit 40 includes at least one superabrasive cutting element configured according to any of the previously described embodiments of superabrasive elements or compacts. The rotary drill bit 40 comprises a bit body 42 that includes radially and longitudinally extending blades 44 with leading faces 46, and a threaded pin connection 48 for connecting the bit body 42 to a drilling string. The bit body 42 defines a leading end structure for drilling into a subterranean formation by rotation about a longitudinal axis 50 and application of weight-on-bit. At least one superabrasive cutting element, fabricated according to any of the previously described superabrasive element or compact embodiments, may be affixed to rotary drill bit 40. As best shown in FIG. 9, a plurality of cutting elements 52 are secured to the blades 44. For example, each of the cutting elements 52 may include a superabrasive table 54 (e.g., a diamond table) bonded to a substrate 56. More generally, the superabrasive tables 54 may comprise any superabrasive element disclosed herein, without limitation. In some embodiments of the present invention, the cutting elements 52 may be formed by separately forming a superabrasive element as disclosed herein and employing a structure for affixing the superabrasive element to the bit body 42 as disclosed in U.S. Patent Application No. 60/850,969. U.S. Patent Application No. 60/850,969 is incorporated herein, in its entirety, by this reference. In addition, if desired, in some embodiments of the present invention, a number of the cutting elements 52 may be conventional in construction. Also, circumferentially adjacent blades 44 define so-called junk slots 58 therebetween, as known in the art. Additionally, the rotary drill bit 40 includes a plurality of nozzle cavities 60 for communicating drilling fluid from the interior of the rotary drill bit 40 to the cutting elements 52.

FIGS. 8 and 9 merely depict one embodiment of a rotary drill bit that employs at least one cutting element including a superabrasive element fabricated and structured in accordance with the disclosed embodiments, without limitation. The rotary drill bit 40 is used to represent any number of earth-boring tools or drilling tools, including, for example, core bits, roller-cone bits, fixed-cutter bits, eccentric bits, bicenter bits, reamers, reamer wings, or any other downhole tool including superabrasive cutting elements or inserts, without limitation.

The superabrasive elements or compact disclosed herein may also be utilized in applications other than cutting technology. The disclosed superabrasive element embodiments may be used in wire dies, bearings, artificial joints, inserts, cutting elements, and heat sinks Thus, any of the superabrasive elements or compacts disclosed herein may be employed in an article of manufacture including at least one superabrasive element or compact.

Thus, the embodiments of superabrasive elements or compact disclosed herein may be used on any apparatus or structure in which at least one conventional PCD element or compact is typically used. For example, in one embodiment of the present invention, a rotor and a stator (i.e., a thrust bearing apparatus) may each include a superabrasive element or compact according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive elements or compacts disclosed herein may be incorporated. The embodiments of superabrasive elements or compacts disclosed herein may also form all or part of heat sinks, wire dies, bearing elements, cutting elements, cutting inserts (e.g., on a roller cone type drill bit), machining inserts, or any other article of manufacture as known in the art. Other examples of articles of manufacture that may use any of the superabrasive elements or compacts disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

The following working examples of the present invention set forth various formulations for forming superabrasive cutting elements. The following working examples provide further detail in connection with the specific embodiments described above.

Comparative Working Example 1

Two conventional PDCs were formed from a mixture of relatively larger diamond particles being in excess of about 90 weight percent of the mixture with the balance being relatively smaller diamond particles. The mixture was placed adjacent to a cobalt-cemented tungsten carbide substrate. The mixture and substrate were placed in a niobium can and sintered at a temperature of about 1400° Celsius and about 60 kilobar for about 60 seconds to form each of the conventional PDCs. The first conventional PDC was acid-leached to a depth of 62 μm to remove the cobalt from the diamond table. The second conventional PDC was acid-leached to a depth of 76 μm to remove the cobalt from the diamond table. The thermal stability of the as-formed conventional PDC was evaluated by measuring the distance cut in a granite workpiece prior to failure without using coolant. The distance cut is considered representative of the thermal stability of the PDC. The first conventional PDC was able to cut a distance of only 2100 linear feet in the granite workpiece. The second conventional PDC was able to cut a distance of only 3300 linear feet in the granite workpiece.

Working Example 2

Two PCD cutting elements were each formed from a mixture of about 15 weight percent silicon particles and 5 weight percent titanium particles, with the balance being the same diamond formulation as comparative example 1. A first PCD cutting elements was formed by placing the mixture within a niobium can and sintering at a temperature of about 1400° Celsius and about 60 kilobar for about 100 seconds to form a PCD cutting element. A second PCD cutting element was formed by placing the mixture within a niobium can and sintering at a temperature of about 1420° Celsius and about 60 kilobar for about 100 seconds to form a PCD cutting element.

The thermal stability of the as-formed PCD cutting elements of example 2 were evaluated by measuring the distance cut in a granite workpiece without using coolant. The PCD cutting elements of example 2 were able to cut a distance greater than 33000 linear feet in a granite workpiece without failing and without using coolant. This is significantly greater than the distances of only 2100 and 3300 linear feet cut by the conventional PDCs of comparative example 1. Thus, thermal stability tests indicate that the PCD cutting elements of example 2 exhibited a significantly improved thermal stability compared to the conventional PDCs of comparative example 1.

Drop-weight tests also indicated that the PCD cutting elements of example 2 exhibited an impact resistance similar to a conventionally fabricated PDC, such as the comparative example 1.

Figure 10:
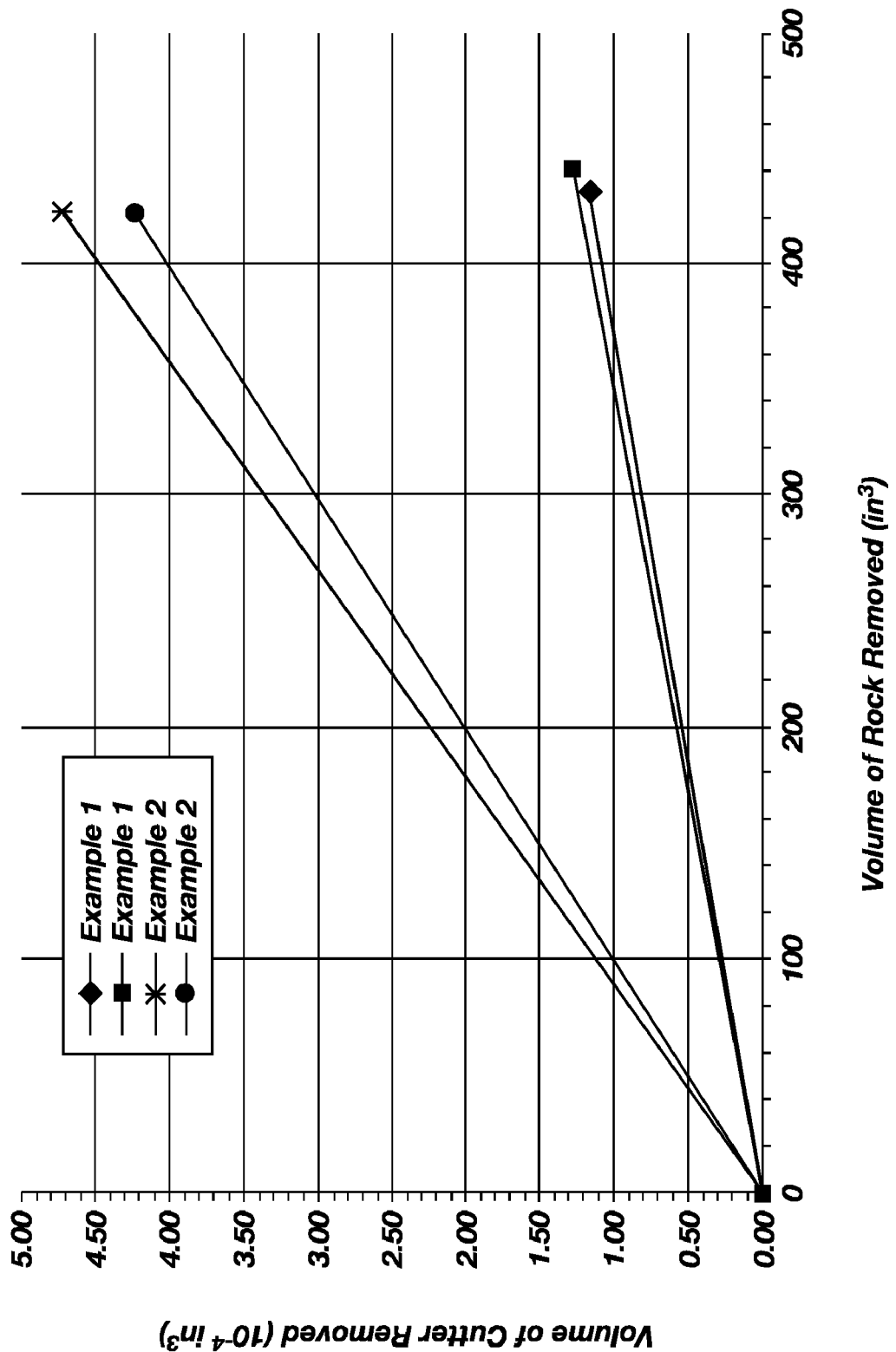
FIG. 10 is a graph illustrating the volume of superabrasive material removed as a function of rock volume removed for a conventional, leached PDC and for working example 2 of the present invention.

FIG. 10 shows wearflat volume tests for the PDCs of comparative example 1 and the PCD cutting elements of example 2. The wearflat volume tests indicated that the PCD cutting elements of example 2 exhibited a decreased wear resistance compared to the wear resistance of the PDC of comparative example 1. However, the wear resistance of the PCD cutting elements of example 2 is still more than sufficient to function as a PCD cutting element for subterranean drilling applications.

X-ray diffraction ("XRD") was used on control samples of PCD cutting elements to determine the phases present when a PCD cutting element is fabricated according to example 2. XRD showed that diamond, SiC, $TiSi_2$, and $Ti_3SiC_2$ were present. Elemental titanium and silicon was not detected by XRD. Therefore, the binder constituent that bonds the diamond grains together comprises almost entirely the following inorganic-compound phases: SiC, $TiSi_2$, and $Ti_3SiC_2$.

The foregoing description, for purposes of explanation, used specific nomenclature to provide a thorough understanding of the present invention. However, it will be apparent to one skilled in the art that the specific details are not required in order to practice the present invention. The foregoing descriptions of specific embodiments of the present invention are presented for purpose of illustration and description. They are not intended to be exhaustive or to limit the invention to the precise forms disclosed. One ordinary skill in the art will recognize that many modifications and variations are possible in view of the above teachings. The embodiments are shown and described in order to best explain the principles of the present invention and its practical applications, to thereby enable others skilled in the art to best utilize the invention and various embodiments with various modifications as are suited to the particular use contemplated. It is intended that the scope of the present invention be defined by the following claims and their equivalents. The words "including" and "having" or variants thereof, as used herein, including the claims, shall have the same meaning as the word "comprising."

The invention claimed is:

1. A superabrasive element, comprising:
    a plurality of superabrasive grains; and
    a binder constituent bonding at least a portion of the superabrasive grains together, the binder constituent including at least one metal-borocarbide phase.

2. The superabrasive element of claim 1 wherein the at least one metal-borocarbide phase is selected from the group consisting of borcarbides of titanium, iron, cobalt, nickel, zirconium, niobium, molybdenum, tantalum, and tungsten.

3. The superabrasive element of claim 1 wherein the superabrasive grains comprise at least one member selected from the group consisting of diamond grains and cubic boron nitride grains.

4. The superabrasive element of claim 1 wherein:
    the superabrasive grains comprise diamond grains;
    the one or more inorganic-compound phases comprises titanium di-boride, titanium carbide, and titanium borocarbide.

5. The superabrasive element of claim 1 wherein:
    the superabrasive grains comprise diamond grains; and
    the binder constituent consists essentially of titanium di-boride, titanium carbide, and titanium borocarbide.

6. The superabrasive element of claim 1 wherein the binder constituent consists essentially of the one or more inorganic-compound phases.

7. A superabrasive compact including the superabrasive element according to claim 1 bonded to a substrate.

8. A rotary drill bit including a bit body adapted to engage a subterranean formation during drilling and at least one superabrasive cutting element affixed to the bit body, wherein the at least one superabrasive cutting element comprises the superabrasive element according to claim 1.

9. A superabrasive element, comprising:
    a substantially continuous binder constituent including a plurality of superabrasive grains distributed through the substantially continuous binder constituent; and
    wherein the substantially continuous binder constituent includes one or more inorganic-compound phases, the one or more inorganic-compound phases including at least one of a metal-silicide phase or a metal-silicocarbide phase, the one or more inorganic-compound phases formed in situ during heating and consolidation of precursor constituents of the superabrasive element.

10. The superabrasive element of claim 9 wherein:
    the metal-silicide phase is selected from the group consisting of silicides of titanium, iron, cobalt, nickel, zirconium, niobium, molybdenum, tantalum, and tungsten; and
    the metal-silicocarbide phase is selected from the group consisting of silicocarbides of titanium, iron, cobalt, nickel, zirconium, niobium, molybdenum, tantalum, and tungsten.

11. The superabrasive element of claim 9 wherein the superabrasive grains comprise at least one member selected from the group consisting diamond grains and cubic boron nitride grains.

12. The superabrasive element of claim 9 wherein:
the superabrasive grains comprise diamond grains; and
the substantially continuous binder constituent comprises titanium di-silicide, silicon carbide, and titanium silicocarbide.

13. The superabrasive element of claim 9 wherein:
the superabrasive grains comprise diamond grains; and
the substantially continuous binder constituent consists essentially of titanium di-silicide, silicon carbide, and titanium silicocarbide.

14. The superabrasive element of claim 9 wherein the substantially continuous binder constituent comprises titanium di-silicide, silicon carbide, and titanium silicocarbide.

15. The superabrasive element of claim 14 wherein the silicon carbide comprises a majority of the substantially continuous binder constituent.

16. A superabrasive compact including the superabrasive element according to claim 9 bonded to a substrate.

17. A rotary drill bit including a bit body adapted to engage a subterranean formation during drilling and at least one superabrasive cutting element affixed to the bit body, wherein the at least one superabrasive cutting element comprises the superabrasive element according to claim 9.

* * * * *